(12) United States Patent
Nomura et al.

(10) Patent No.: US 8,091,452 B2
(45) Date of Patent: Jan. 10, 2012

(54) METHOD FOR MANUFACTURING DRILL HEAD

(75) Inventors: Takuji Nomura, Amagasaki (JP);
Makoto Sakai, Amagasaki (JP)

(73) Assignee: Unitac, Incorporated, Hyogo (JP)

( * ) Notice: Subject to any disclaimer, the term of this patent is extended or adjusted under 35 U.S.C. 154(b) by 281 days.

(21) Appl. No.: 12/348,620

(22) Filed: Jan. 5, 2009

(65) Prior Publication Data

US 2009/0120240 A1    May 14, 2009

Related U.S. Application Data

(63) Continuation of application No. PCT/JP2007/070604, filed on Oct. 23, 2007.

(30) Foreign Application Priority Data

Nov. 17, 2006  (JP) .................................. 2006-311949

(51) Int. Cl.
*B21K 5/02*   (2006.01)
(52) U.S. Cl. ..................................................... 76/108.2
(58) Field of Classification Search ................ 76/108.1, 76/108.2, 108.4, 108.6; 175/320
See application file for complete search history.

(56) References Cited

U.S. PATENT DOCUMENTS

| | | | |
|---|---|---|---|
| 1,746,423 A * | 2/1930 | Hartman ........................ 175/385 |
| 2,051,525 A * | 8/1936 | Howard ......................... 403/343 |
| 2,649,284 A * | 8/1953 | Letts ............................ 175/412 |
| 2,782,005 A * | 2/1957 | Appleton ....................... 175/339 |
| 3,127,794 A * | 4/1964 | Stockard, Jr. .................. 76/108.1 |
| 4,045,646 A * | 8/1977 | Lichte ....................... 219/121.13 |
| 4,067,406 A * | 1/1978 | Garner et al. .................. 175/341 |
| 4,396,077 A * | 8/1983 | Radtke .......................... 175/428 |
| 4,552,232 A * | 11/1985 | Frear ............................ 175/337 |
| 4,559,852 A * | 12/1985 | Atkinson ...................... 76/108.2 |
| 4,750,573 A * | 6/1988 | Wynn ............................ 175/337 |
| 5,346,026 A * | 9/1994 | Pessier et al. ................. 175/331 |
| 5,641,029 A * | 6/1997 | Beaton et al. ................. 175/356 |
| 6,135,219 A * | 10/2000 | Scott ............................. 175/432 |
| 6,206,116 B1 * | 3/2001 | Saxman ........................ 175/378 |
| 6,220,117 B1 * | 4/2001 | Butcher ....................... 76/108.2 |
| 6,348,110 B1 * | 2/2002 | Evans .......................... 148/528 |

(Continued)

FOREIGN PATENT DOCUMENTS

JP            59-107828            6/1984

(Continued)

*Primary Examiner* — Kenneth E. Peterson
*Assistant Examiner* — Jennifer Swinney
(74) *Attorney, Agent, or Firm* — Womble Carlyle (57) ABSTRACT

The present invention provides a method for reliable, easy, and low cost manufacturing of a drill head of such a kind that a cutting blade tip is brazed to a cutting blade mounting seat of a head body, with high dimensional accuracy and blade edge accuracy.

In the manufacturing of a drill head 10 used with a screw shank 2 coupled in threading relation with a distal end portion of a tool shank 5 of a deep-hole cutting drill and with bounded circumferential face portions 22 and 23 at both sides which sandwich a male thread 21 portion adhered closely to a circumferential face of the tool shank 5, a screw shank cylindrical member 20A with a cutting stock 7 left at least on the bounded circumferential face portions 22 and 23 is welded and integrated with a rear end of a head body 1 for which cutting blade tips 30a to 30c have been brazed, thereafter cutting the cutting stock 7 of the screw shank cylindrical member 20A so as to be finished into the screw shank 2.

15 Claims, 8 Drawing Sheets

U.S. PATENT DOCUMENTS

| | | | |
|---|---|---|---|
| 6,415,687 B2 * | 7/2002 | Saxman | 76/108.2 |
| 7,004,691 B2 * | 2/2006 | Nomura | 408/59 |
| 7,331,410 B2 * | 2/2008 | Yong et al. | 175/331 |
| 2006/0278442 A1 * | 12/2006 | Kristensen | 175/393 |

FOREIGN PATENT DOCUMENTS

| | | |
|---|---|---|
| JP | 2004-090105 | 3/2004 |
| JP | 2004283969 A * | 10/2004 |
| JP | 2004283970 A * | 10/2004 |
| JP | 2004283971 A * | 10/2004 |
| JP | 2005-088102 | 4/2005 |

* cited by examiner

METHOD FOR MANUFACTURING DRILL HEAD

RELATED APPLICATIONS

This application is a continuation of our co-pending application Ser. No. PCT/JP2007/070604, filed Oct. 23, 2007.

TECHNICAL FIELD

The present invention relates to a method for manufacturing a drill head detachably attached to a distal end of a tool shank of a deep-hole cutting drill, and more specifically a drill head for which a cutting blade tip is brazed to a cutting blade mounting seat of a head body.

BACKGROUND OF THE INVENTION

Figure 5A:
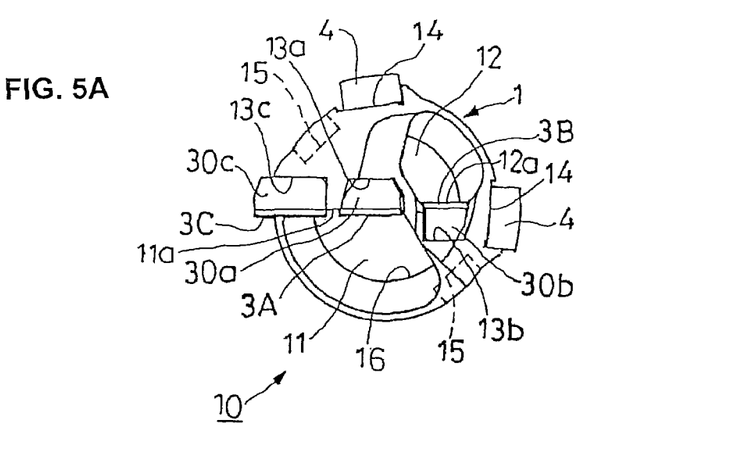
Figure 5B:
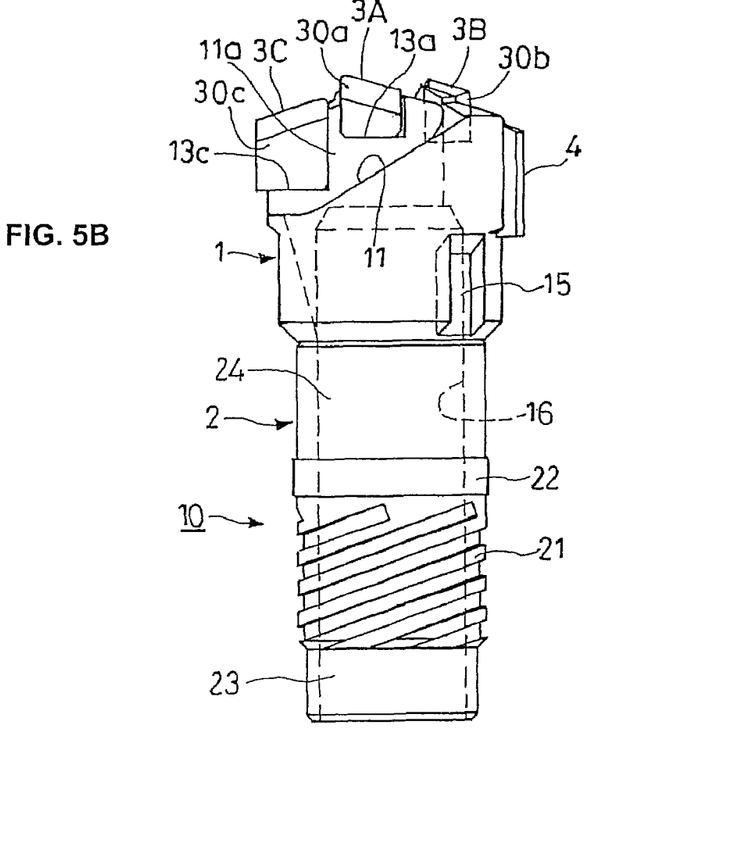

A drill head of this kind is composed of a roughly cylindrical head body 1 provided with cutting blades 3A to 3C along end walls 11a and 12a which extend in a common radial direction of chip inlet ports 11 and 12 which are opened in large and small fan shapes at a front end face thereof, a cylindrical screw shank 2 provided with a male thread 21 in an area which is slightly to a rear portion on an outer circumferential face thereof, as shown in FIGS. 5A and 5B, for example. The cutting blades 3A to 3C are generally formed by brazing cutting blade tips 30a to 30c made of cemented carbide to cutting blade mounting seats 13a to 13c concavely provided on the end walls 11a and 12a of the head body 1 made of steel. In FIGS. 5A and 5B, the head body 1 is composed of guide pads 4 made of cemented carbide and brazed to respective guide pad mounting seats 14 concavely provided at two locations at a front portion of the outer circumferential face thereof, and a pair of chucking groove portions 15 formed at radially opposed positions at a rear portion of the outer circumferential face thereof.

Figure 6:
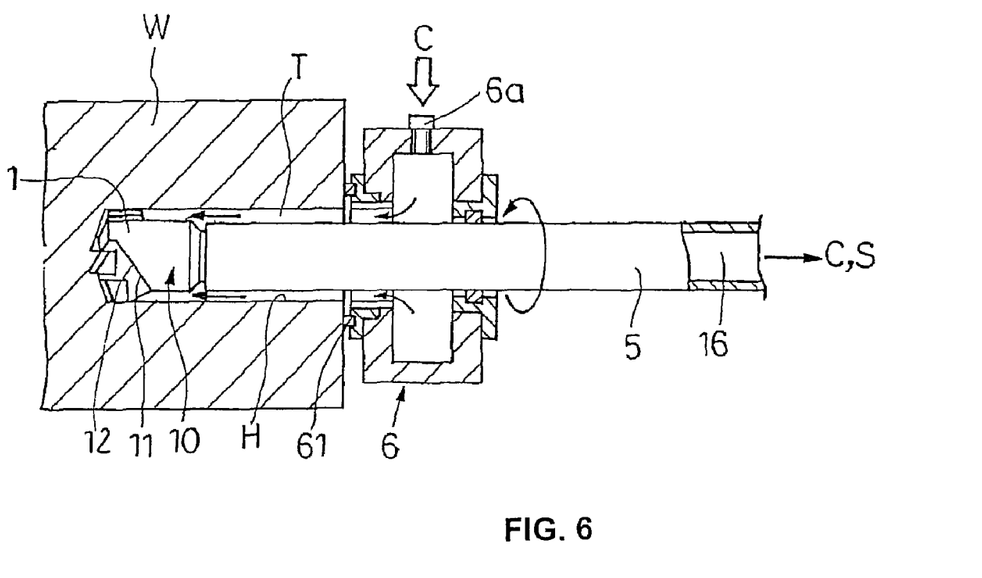
FIG. 6 is a longitudinal sectional side view showing deep-hole cutting by a deep-hole cutting drill employing the drill head.
Figure 7:
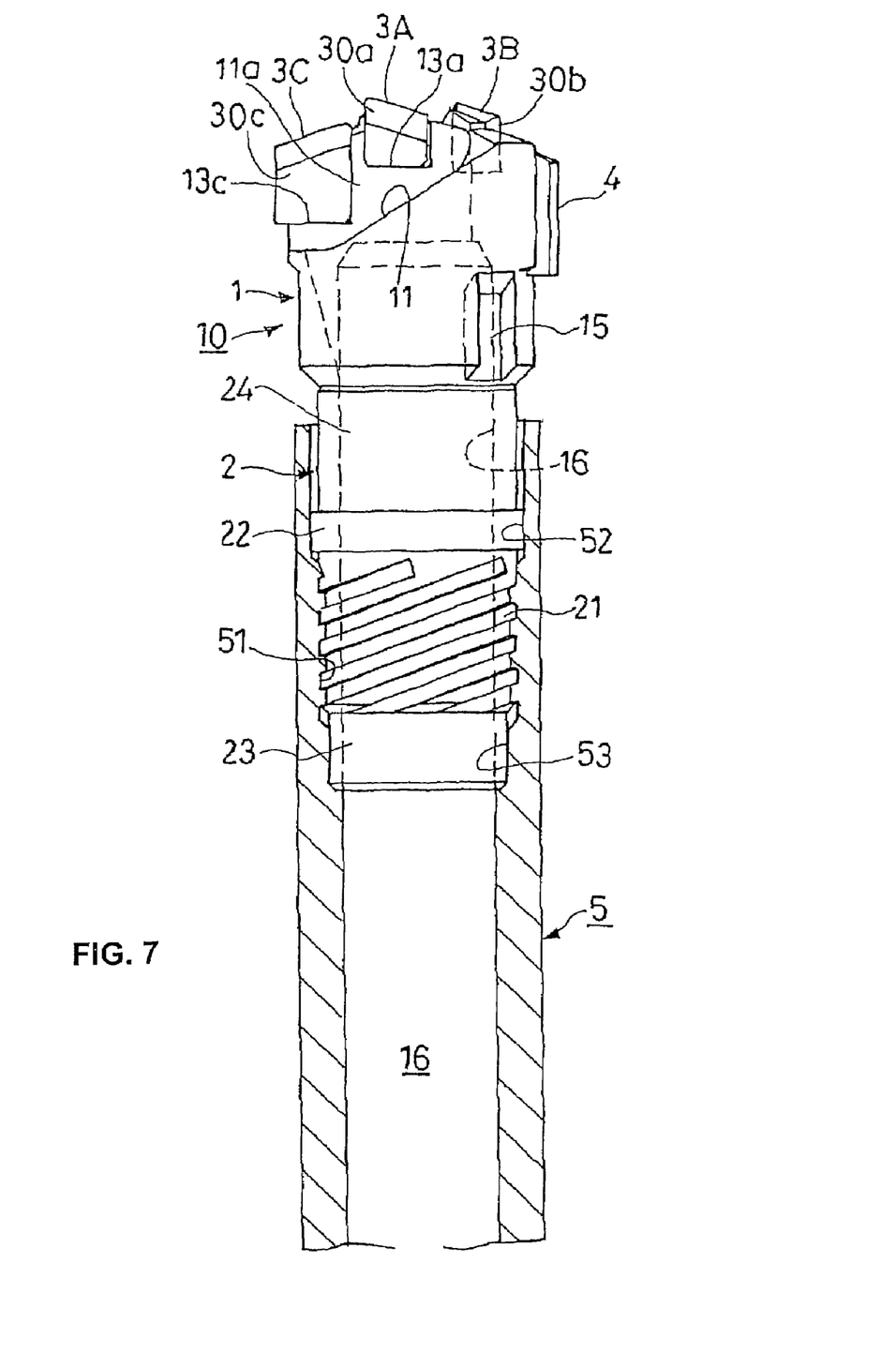
FIG. 7 is a partial longitudinal sectional view showing a coupling condition of the drill head and screw shank of the deep-hole cutting drill.

When using the drill head 10, as shown in FIGS. 6 and 7, a screw shank 2 is inserted into and coupled in threading relation with a distal end portion of a female thread 51 of a circular tubular tool shank (also referred to as a boring bar) 5 of a deep-hole cutting drill. At this time, outer circumferential parts at both front and rear sides sandwiching the male thread 21 portion of the screw shank 2 are adhered closely, as bounded circumferential face portions 22 and 23, to bounded inner circumferential portions 52 and 53 of the tool shank 5. As a result, the both components 10 and 5 are firmly coupled and integrated, while the insides of the head body 1 and the screw shank 2 and a hollow interior of the tool shank 5 are communicated, constituting a chip discharging passage 16. It is noted that the bounded circumferential face portion 22 at the front side is configured to be narrow and is greater in diameter than a non-bounded circumferential face portion 24 that is in front of it. On the other hand, the bounded circumferential face portion 23 at the rear side occupies the whole from the male thread 21 portion to a bordering portion at the rear end in the screw shank 2.

A deep-hole cutting is carried out by coupling the tool shank 5 with a spindle of a machine tool to be rotatingly driven or reversely by rotating a work material W. In this case, however, a coolant is supplied in the manner of an external supply. Therefore, as shown in FIG. 6, using a coolant supply jacket 6 that encloses the tool shank 5 oil-tight, a coolant C is introduced into the jacket 6 from a feed port 6a with high pressure, with the jacket 6 press-contacted with a work material W via a seal ring 61. The introduced coolant C in this manner is supplied to a distal end side of the drill head 10 through a gap T between the outer circumferential face of the tool shank 5 and the inner circumferential face of a cutting hole H. Together with a chip S generated in a cutting region, the coolant C is entered into a chip discharging passage 16 from the chip inlet ports 11 and 12 of the drill head 10 and then discharged outside from a proximal end side of the tool shank 5.

Figure 8A:
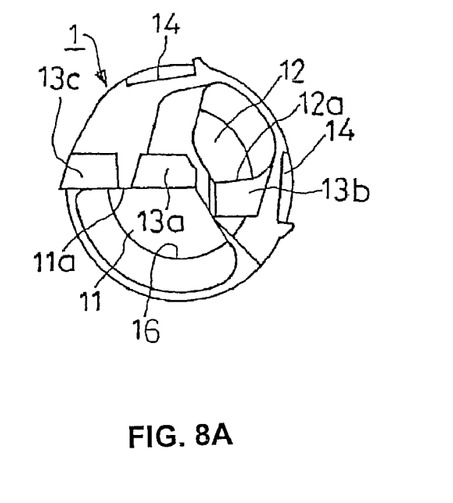
Figure 8B:
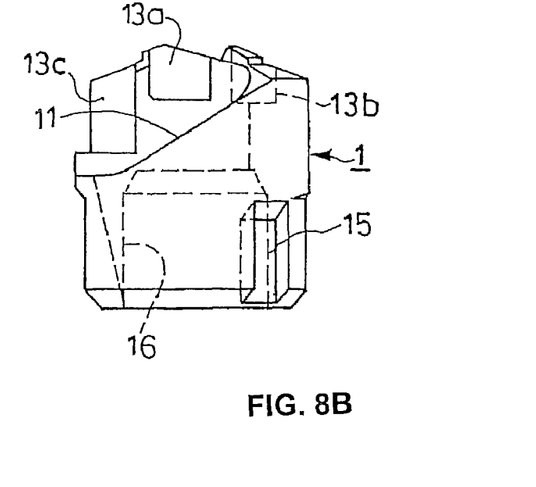
Figure 9:
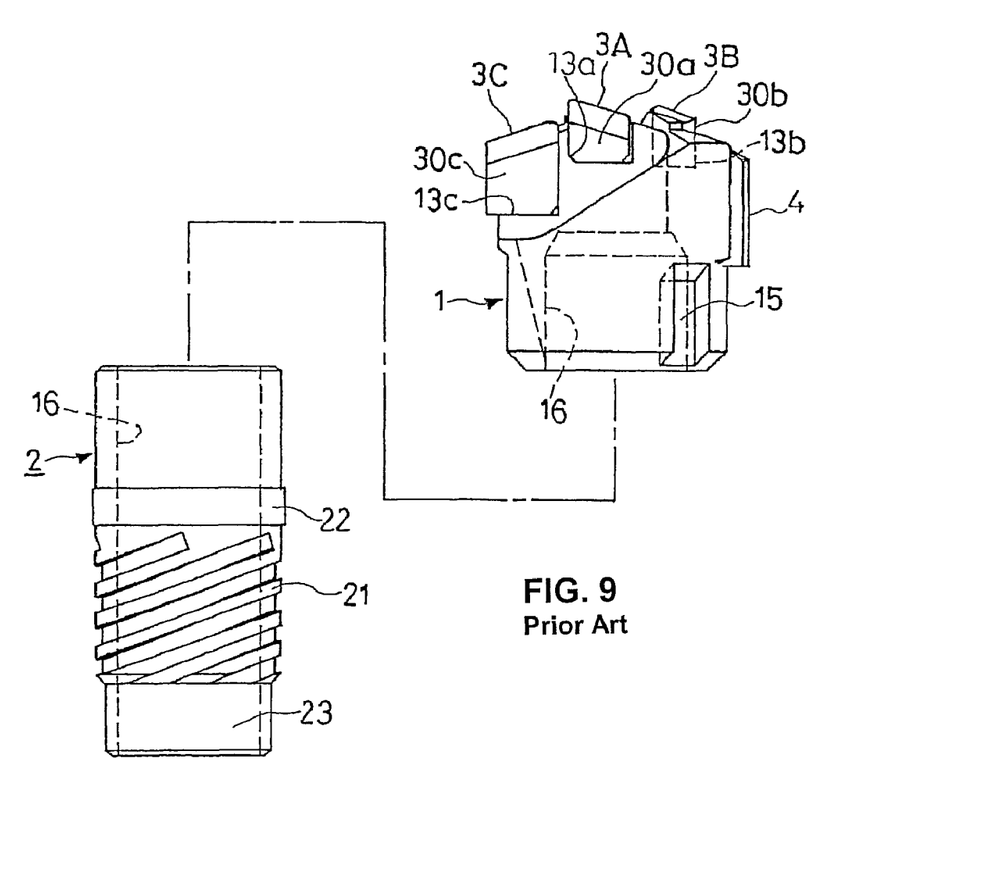
FIG. 9 is an exploded view of a head body and a screw shank of the drill head before being welded by a conventional manufacturing method.

In the manufacturing of such a drill head 10, it was conventionally common that a head body 1 and a screw shank 2 were manufactured individually and the both were welded and integrated. More specifically, the head body 1 provided with cutting blade mounting seats 13a to 13c and pad mounting seats 14 and 14 as shown in FIGS. 8A and 8B was manufactured by casting, etc., while the screw shank 2 was manufactured by cutting and threading a cylindrical member. Cutting blade tips 30a to 30c and guide pads 4 and 4 are brazed to the mounting seats 13a to 13c, 14 and 14 of the head body 1, thereafter concentrically welding the front end of the screw shank 2 to the rear end of the head body 1, as shown in FIG. 9.

In the conventional manufacturing method, however, the screw shank 2 which has been finished into a perfect circle is easily deformed into an ellipse due to thermal strain involved in the welding of the head body 1 and the screw shank 2, and its deformation amount often reaches 100 μm. Accordingly, there was a problem that working accuracy by the obtained drill head was reduced. There was also a drawback that since the cutting blade tips 30a to 30c were brazed, positioning accuracy of a blade edge was difficult to obtain and reduction of cutting performance resulted especially in a case where the cutting blade 3A in the central section was off the shaft center of the head. Although it is not impossible to correct the blade edge accuracy by post-finishing cutting, not only is its operation excessively difficult but also manhours are increased, which results in a great rise in manufacturing costs.

SUMMARY OF THE INVENTION

The present invention was made in view of such circumstances, and accordingly it is an object of the present invention to provide a method for manufacturing a drill head of this kind having high dimensional accuracy and blade edge accuracy, reliably, with ease and at a lower cost.

In order to achieve the foregoing object, the invention as recited in claim 1, is shown with reference numerals in the drawings, in the manufacturing of a drill head 10 used with a screw shank 2 which has been integrated with a head body 1 coupled in threading relation with a distal end portion of a hollow tool shank 5 of a deep-hole cutting drill and with both sides which sandwich a thread (a male thread 21) portion of the screw shank 2 adhered closely as bounded circumferential face portions 22 and 23 to a circumferential face of the tool shank 5, is characterized by welding and integrating a screw shank cylindrical member 20A (20B) having a cutting stock 7 left at least on the bounded circumferential face portions 22 and 23 with the rear end of the head body 1 for which cutting blade tips 30a to 30c have been brazed to cutting blade mounting seats 13a to 13c, and thereafter cutting the cutting stock 7 of the screw shank cylindrical member 20, and finishing it into the screw shank 2.

In the manufacturing method of the drill head 10 in claim 1, the invention as recited in claim 2 is configured such that the screw shank cylindrical member 20A comprises a cylindrical body with the cutting stock 7 left on the entire surface of inner and outer peripheries 20a and 20b thereof and the thread (the male thread 21) portion is threaded in the finishing processing.

In the manufacturing method of the drill head 10 in claim 1, the invention as recited in claim 3 is configured such that the thread (the male thread 21) portion and the bounded circumferential face portions 22 and 23 at both sides are provided on the outer circumferential face side.

In the manufacturing method of the drill head 10 in claim 1, the invention as recited in claim 4 is configured such that the head body 1 is made of steel and the cutting blade tips 30a to 30c are made of cemented carbide.

In the manufacturing method of the drill head 10 in any one of claims 1 to 4, the invention as recited in claim 5 is configured such that the insides of the head body 1 and the screw shank 2 constitute a chip discharging passage 16 and chip inlet ports 11 and 12 communicating with the chip discharging passage 16 are open at the front end face of the head body 1.

In the manufacturing method of a drill head according to the invention in claim 1, the screw shank cylindrical member with the cutting stock left at least on a part to be made into the bounded circumferential face portion when coupled to the tool shank is welded to the head body, and finished into the screw shank by cutting the cutting stock after the welding. Accordingly, even if thermal strain involved in the welding is inevitable, strain deformation of the bounded circumferential face portion, which deformation influences coupling accuracy with the tool shank, is completely eliminated by cutting the cutting stock. In addition, even if blade edge accuracy is lowered by brazing of the cutting blade tips and the central cutting blade is off the shaft center of the head body, shifting the shaft centers of the head body and the screw shank cylindrical member in the welding allows for easy adjustment such that the cutting blade corresponds to the shaft center of the head, that is, the center of the bounded circumferential face portion of the screw shank. Therefore, according to the manufacturing method, a drill head having high dimensional accuracy and blade edge accuracy and thus capable of exhibiting superior working accuracy and working performance can be obtained reliably with ease and at a lower cost.

According to the invention in claim 2, in the manufacturing method of the foregoing drill head, the cylindrical body with the cutting stock left on the entire face of the inner and outer peripheries is used as the screw shank cylindrical member. Since the whole shape including the thread portion of the screw shank is determined in post-finishing after the welding, a disadvantage does not occur even if thermal strain involved in the welding is severe, so that the drill head with higher dimensional accuracy and blade edge accuracy can be provided.

According to the invention in claim 3, the drill head having the outside screw type screw shank and attached by being threadedly inserted into the distal end of the tool shank of the drill can be manufactured.

According to the invention in claim 4, the drill head with the cutting blade tips made of cemented carbide mounted on the head body made of steel can be manufactured.

According to the invention in claim 5, the drill head capable of discharging a chip involved in cutting, together with the coolant, from the chip inlet port on the front end face of the head body via the insides of the head body and the screw shank can be manufactured.

BRIEF DESCRIPTION OF THE DRAWINGS

FIG. 1 illustrates a manufacturing procedure of a drill head in accordance with a first embodiment of the present invention.

FIG. 5 illustrates an example of a drill head to which the manufacturing method of the present invention is applied, FIG. 5A being a front end view and FIG. 5B being an elevational view.

FIG. 8 illustrates the body of a drill head, and FIG. 8A being a front end view and FIG. 8B being an elevational view.

EXPLANATION OF SYMBOLS

1: head body
10: drill head
11, 12 chip inlet ports
11a, 12a end wall
13a-13c cutting blade mounting seats
16 chip discharging passage
2 screw shank
20A, 20B screw shank cylindrical member
20a outer periphery
20b inner periphery
21 male thread
22, 23 circumferential face portions
3A-3C cutting blade
30a-30c cutting blade tip
5 tool shank
7 cutting stock

BEST MODE FOR CARRYING OUT THE INVENTION

Figure 2:
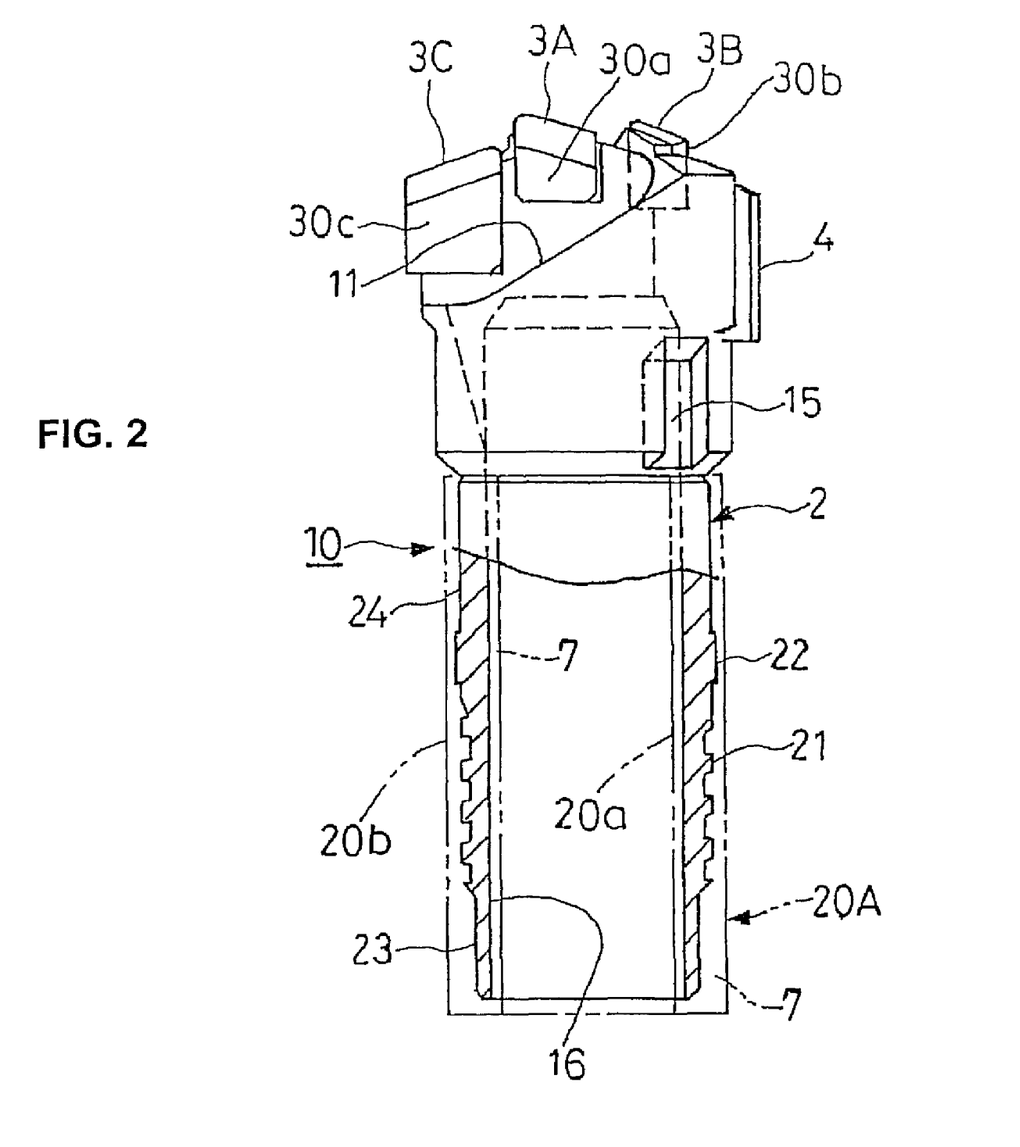
FIG. 2 is a partial longitudinal section view of the drill head after being manufactured by the first embodiment.
Figure 3:
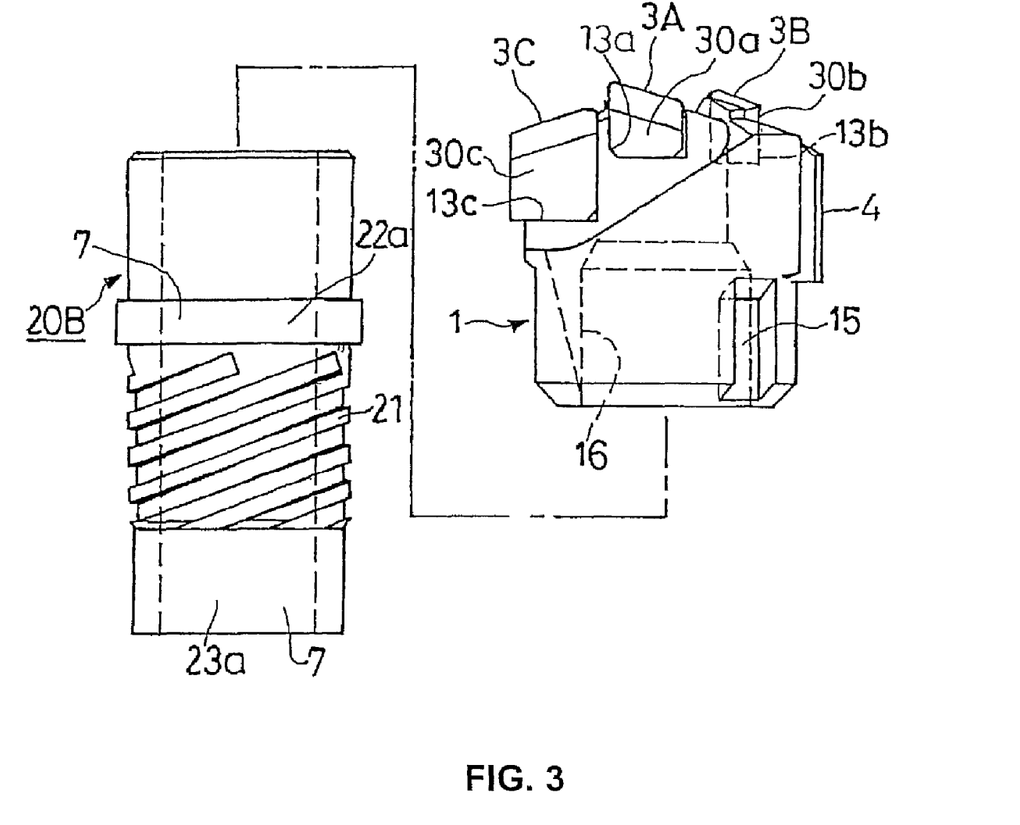
FIG. 3 illustrates a manufacturing procedure of the drill head in accordance with a second embodiment of the present invention, showing a head body and a cylindrical body before being welded.
Figure 4:
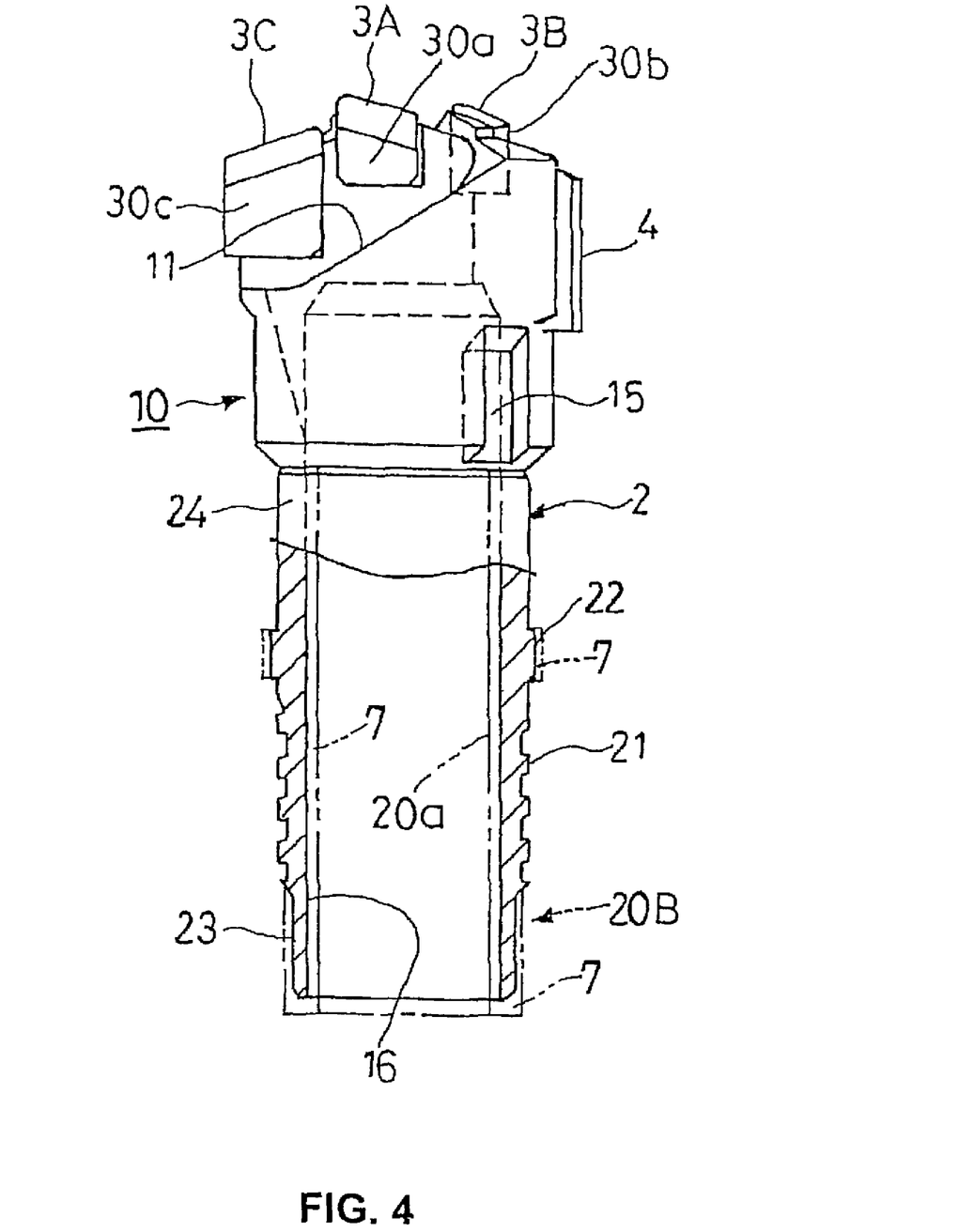
FIG. 4 is a partial longitudinal section view of the drill head after being manufactured by the second embodiment.

Now, embodiments of the manufacturing method of the drill head according to the present invention are described in detail with reference to the drawings. FIGS. 1 and 2 illustrate a first embodiment, and FIGS. 3 and 4 illustrate a second embodiment. In both embodiments, a drill head with the same structure as one shown in FIG. 5 and already mentioned above is targeted for manufacturing, and the same symbols as in FIG. 5 are given to its components.

In this manufacturing method of the drill head, a head body 1 is manufactured in the same way as conventionally; a head body 1 with cutting blade mounting seats 13a to 13c and pad mounting seats 14 and 14 is manufactured by casting as shown in FIGS. 8A and 8B. More specifically, the head body 1 has a roughly short cylindrical shape as a whole. Large and small fan-shaped chip inlet ports 11 and 12 communicating with a chip discharging passage 16 inside are open at the front end face of the head body 1. Both of the chip inlet ports 11 and 12 have common radial end walls 11a and 12a. At the end wall 11a side, a central cutting blade mounting seat 13a and an outside cutting blade mounting seat 13c are concavely provided, and at the end wall 12a side, an intermediate cutting blade mounting seat 13b is concavely provided, respectively. Pad mounting seats 14 and 14 which are long in an axle direction and are provided with concave portions are formed at two locations at the front side of the outer circumferential face of the head body 1. Chucking groove portions 15 and 15 extending along the axial direction are formed on radially opposed positions at the rear side of the outer circumferential face of the head body 1.

Figure 1A:
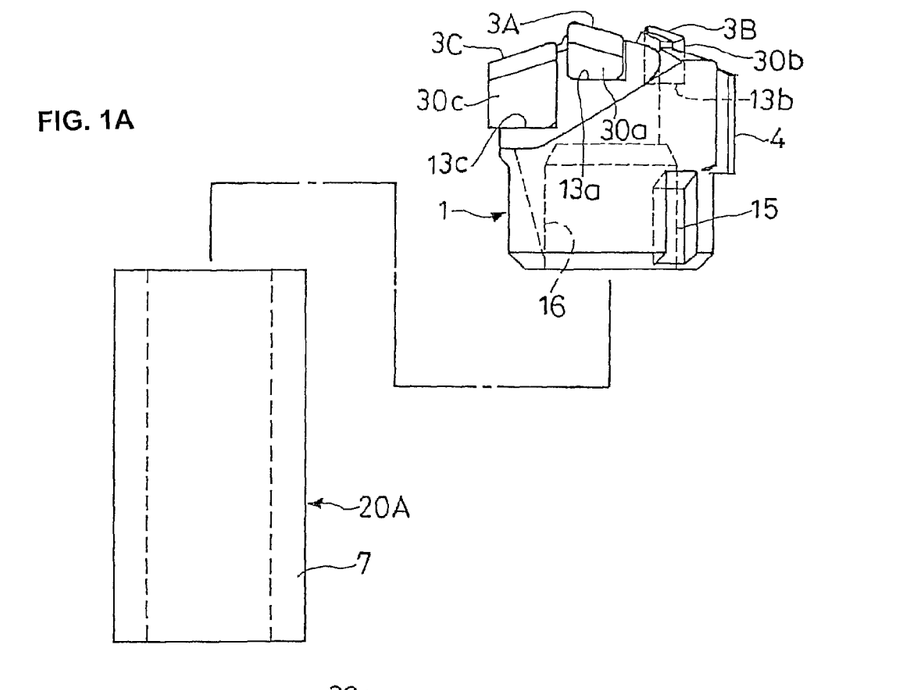
FIG. 1A is an elevational view of a head body and a cylindrical body before welding and FIG. 1B is an elevational view of the same after welding.
Figure 1B:
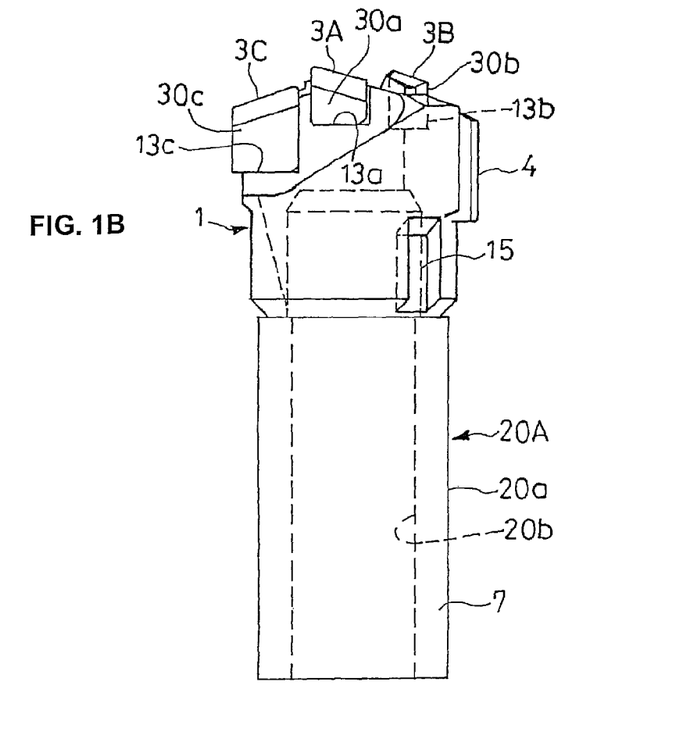

In the head body 1, as shown in FIG. 1A, cutting blade tips 30a to 30c made of cemented carbide are brazed to the cutting blade mounting seats 13a to 13c and guide pads 4 and 4 similarly made of cemented carbide are brazed to the pad mounting seats 14 and 14, respectively, in advance. Accordingly, in the manufacturing method of the first embodiment, the screw shank cylindrical member 20A which includes a simple thick-walled tubular cylindrical body is used as a raw material for the screw shank 2 (See FIG. 5B), and its front end face is welded to the rear end face of the head body 1 after the brazing as in FIG. 2B. It is noted that the screw shank cylindrical member 20A has the cutting stock 7 on the entire face of the inner and outer peripheries 20a and 20b so as to be made into the screw shank 2. Thus, the screw shank cylindrical member 20A is greater in outer diameter and smaller in inner diameter with respect to the targeted screw shank 2.

Next, the inner periphery 20a and the outer periphery 20b of the screw shank cylindrical member 20A integrated with the head body 1 by the welding are rotatingly cut into perfect circles up to predetermined inner and outer diameters. The outer periphery 20b is configured to each outer diameter of the bounded circumferential face portions 22 and 23, a male thread 21 forming portion and the non-bounded circumferential face portion 24, and the male thread 21 forming portion is threaded, whereby the screw shank cylindrical member 20A is finished into the screw shank 2 as shown in FIG. 2. This finishing working can be easily carried out by chucking the whole with the use of the groove portions 15 and 15 of the head body 1 side and by rotation of a work piece side or finishing tool side and axial relative displacement in the conventional manner. In FIG. 2, a cross-section of the initial screw shank cylindrical member 20A is shown by a phantom line, and only a difference with a cross-section shown by a solid line is cut as the cutting stock 7 and thinner-walled by the finishing working of threading.

In this kind of manufacturing method of the drill head 10, when the screw shank cylindrical member 20A is welded to the head body 1, thermal strain which is involved in the heat input and is unavoidable is generated. However, the strain deformation is completely eliminated by perfect circularization by the post-finishing cutting and threading of finishing the cylindrical member 20A into the screw shank 2. Although the post-finishing cutting and the threading cause strain due to mechanical stress, its value is less than or comparable to about 10 μm. Since the value is smaller than that of the thermal strain in the welding by an order of magnitude, it hardly constitutes an issue. Further, since the cutting blades 3A to 3C are formed by brazing of the cutting blade tips 30a to 30c, a brazing material intervenes on a connection interface and thus blade edge accuracy cannot be set exactly. However, even if the central cutting blade 3A which influences cutting performance is off the shaft center of the head body 1, the cutting blade 3A can be easily adjusted so as to correspond to the shaft center of the head, that is, the center of the screw shank 2 by shifting the shaft centers of the head body 1 and the cylindrical member 20A in the welding.

Therefore, according to the manufacturing method, the drill head 10 having high dimensional accuracy and blade edge accuracy and thus being capable of exhibiting superior working accuracy and working performance can be obtained reliably with ease and at a lower cost.

In the manufacturing method of a second embodiment, for a head body 1, cutting blade tips 30a to 30c and guide pads 4 and 4 are brazed in advance in the same manner as in the first embodiment. For a screw shank 2 (see FIG. 5B), a screw shank cylindrical member 20B prefinished as shown in FIG. 3 is used as its raw material. More specifically, the screw shank cylindrical member 20B is formed with a male thread 21 on an outer periphery side by prefinishing. At both front and rear sides of the male thread 21 portion, a cutting stock 7 is left as bounded circumferential face forming portions 22a and 23a for the bounded circumferential face portions 22 and 23 to be formed (see FIGS. 4 and 5B), and a cutting stock 7 is left also on the entire face of an inner periphery 20a.

In this manufacturing method, a front end face of the screw shank cylindrical member 20B is welded to a rear end face of the head body 1 after the foregoing brazing, as shown in FIG. 3. After that, the inner periphery 20a of the cylindrical member 20B which has been integrated with the head body 1 is rotatingly cut into a perfect circle up to a predetermined inner diameter, while, for the outer periphery, the bounded circumferential face forming portions 22a and 23a are rotatingly cut into perfect circles up to predetermined outer diameters so as to form the bounded circumferential face portions 22 and 23, thereafter finished into a drill head 10 as shown in FIG. 4. This finishing working is carried out by chucking the whole with the use of groove portions 15 and 15 of the head body 1. It is noted that a cross-section of the initial screw shank cylindrical member 20B is shown by a phantom line, and a difference with a cross-section shown by a solid line is the cutting stock 7.

The screw shank cylindrical member 20B used in the manufacturing method of the second embodiment is provided with the male thread 21 on the outer periphery side in advance and does not have a cutting stock 7 on a non-bounded circumferential face portion 24. However, the bounded circumferential face forming portions 22a and 23a are provided with the cutting stock 7. As a result, even if inevitable strain deformation involved in heat input in the welding to the head body 1 occurs, perfect circularization by post-finishing cutting of the bounded circumferential face forming portions 22a and 23a eliminates strain deformation of the bounded circumferential face portions 22 and 23. Consequently, superior working accuracy and working performance as a drill can be ensured due to being free from the strain deformation in the bounded circumferential face portions 22 and 23 since coupling accuracy of the drill head 10 with respect to a tool shank 5 (see FIGS. 6 and 7) is entirely performed by the bounded circumferential face portions 22 and 23.

In the foregoing first and second embodiments, the drill head 10 whose head body 1 is provided with three of central, intermediate and outer cutting blades 3A to 3C is exemplified. However, the present invention can also be applied to the manufacturing of any drill head wherein the number of cutting blades is 1, 2 or 4 or more. The cutting blade tip made of cemented carbide as exemplified is recommended for the head body made of steel, but a cutting blade tip made of other tool materials capable of brazing relative to the head body may be used. For the screw shank 2, there is an inside screw type other than the exemplified outside screw type. The inside screw type screw shank is provided with a female thread on an inner circumferential face and threadedly fitted with an outer periphery of a distal end of the tool shank of the drill. The manufacturing method of the present invention is applicable to either type.

The drill head 10 of the first and second embodiments as described above is for a single tube system, that is, the system in which, as in FIG. 6, the coolant C supplied to the cutting region through the gap T between the cutting hole H and the tool shank 5 is discharged together with the chip S from the inside chip discharging passage 16. However, the present invention can also be applied to a drill head for a double tube system. In the double tube system, a tool shank of a drill composes a double cylinder whose central space is made into a chip discharging passage and an outside annular space is made into a coolant supplying passage. By coupling the drill head with a distal end portion of the outer cylinder in threading relation, a distal end of the inner cylinder abuts against an inner circumferential step portion of the drill head, so that a distal end side of the coolant supplying passage is closed. However, the coolant is delivered outside from a delivery hole provided on a peripheral wall portion (corresponding to the non-bounded circumferential face portion 24 of the screw shank 2) of the drill head, and then supplied to the cutting region. Therefore, the drill head for the double tube system has substantially the same fundamental structure as the drill head for the single tube system already mentioned except for having the inner circumferential step portion and the delivery hole.

What is claimed is:

1. A method for manufacturing a drill head comprising a screw shank which has been integrated with a head body, the screw shank configured to be coupled in threading relation with a distal end portion of a hollow tool shank of a deep-hole cutting drill, both sides of the screw shank which sandwich a thread portion of the screw shank being configured to adhere closely as bounded circumferential face portions to a periphery of the tool shank, when the screw shank is coupled with a distal end portion of the tool shank, the method comprising:
   welding and integrating a screw shank cylindrical member having cutting stock left at least on the bounded circumferential face portions with a rear end of the head body for which a cutting blade tip has previously been brazed to a cutting blade mounting seat; and
   thereafter cutting the cutting stock of the screw shank cylindrical member to thereby make at least a portion of the screw shank cylindrical member thinner-walled in order to form the screw shank.

2. The method for manufacturing a drill head according to claim 1, wherein:
   the screw shank cylindrical member comprises a cylindrical body having cutting stock left on the entire face of inner and outer peripheries thereof, and
   the thread portion is threaded in the finishing working.

3. The method for manufacturing a drill head according to claim 2, wherein:
   insides of the head body and the screw shank constitute a chip discharging passage and a chip inlet port communicating with the chip discharging passage is open on a distal end face of the head body.

4. The method for manufacturing a drill head according to claim 1, wherein the thread portion and the bounded circumferential face portions at both sides of the screw shank are provided on an outer periphery side.

5. The method for manufacturing a drill head according to claim 4, wherein:
   insides of the head body and the screw shank constitute a chip discharging passage and a chip inlet port communicating with the chip discharging passage is open on a distal end face of the head body.

6. The method for manufacturing a drill head according to claim 1, wherein the head body is made of steel and the cutting blade tip is made of cemented carbide.

7. The method for manufacturing a drill head according to claim 6, wherein:
   insides of the head body and the screw shank constitute a chip discharging passage and a chip inlet port communicating with the chip discharging passage is open on a distal end face of the head body.

8. The method for manufacturing a drill head according to claim 1, wherein:
   insides of the head body and the screw shank constitute a chip discharging passage and a chip inlet port communicating with the chip discharging passage is open on a distal end face of the head body.

9. The method according to claim 1, comprising:
   providing a screw shank cylindrical member comprising a cylindrical body having cutting stock on an entire face of an inner periphery thereof, and
   removing at least a portion of the cutting stock on the entire face of the inner periphery in the finishing working.

10. A method for manufacturing a deep-hole drill head comprising a head body and a screw shank having spaced apart bounded circumferential face portions, the method comprising:
    providing a head body to which blade tips have previously been brazed; providing a screw shank cylindrical member comprising a front end face, a rear end face, an inner periphery and an outer periphery, the screw shank cylindrical member having cutting stock left on at least one of the inner and outer peripheries,
    welding the front end face of the screw shank cylindrical member to a rear end face of the head body; and
    after welding, cutting the cutting stock of the screw shank cylindrical member to thereby make at least a portion of the screw shank cylindrical member thinner-walled and form a screw shank, said cutting creating:
    (a) spaced apart bounded circumferential face portions.

11. The method according to claim 10, comprising:
    providing a screw shank cylindrical member having cutting stock left on the outer periphery; and
    after welding, cutting the cutting stock on the outer periphery to thereby remove at least a portion of the cutting stock and form a screw shank, said cutting creating:
    (a) spaced apart bounded circumferential face portions, and also
    (b) an external male thread portion between the spaced apart bounded circumferential face portions.

12. The method according to claim 10, comprising:
    providing a screw shank cylindrical member having cutting stock left on the outer periphery; and
    after welding, cutting the cutting stock on the outer periphery to thereby remove at least a portion of the cutting stock and form a screw shank, said cutting creating:
    (a) spaced apart bounded circumferential face portions,
    (b) an external male thread portion between the spaced apart bounded circumferential face portions, and
    (c) a non-bounded circumferential face portion.

13. The method according to claim 10, comprising:
    providing a screw shank cylindrical member already having an external male thread portion and cutting stock left on the outer periphery; and
    after welding, cutting the cutting stock on the outer periphery to thereby remove at least a portion of the cutting stock and form a screw shank, said cutting creating:

(a) spaced apart bounded circumferential face portions on either side of the external male thread portion.

14. The method according to claim 10, comprising:
after welding and prior to cutting, chucking the head body welded to the screw shank cylindrical member with the use of groove portions formed on an outer circumferential face of the head body.

15. The method according to claim 10, comprising
providing a screw shank cylindrical member having cutting stock left on the inner periphery; and
after welding, cutting the cutting stock on the inner periphery to thereby form a screw shank.

* * * * *